US000001196H

United States Statutory Invention Registration [19]

[11] Reg. Number: H1196

Fukazawa et al. [43] Published: Jun. 1, 1993

[54] COLOR PHOTOGRAPHIC LIGHT-SENSITIVE MATERIAL EXCELLENT IN COLOR REPRODUCTION

[75] Inventors: Fumie Fukazawa; Katuya Yabuuchi; Hirofumi Ohtani, all of Hino, Japan

[73] Assignee: Konica Corporation, Japan

[21] Appl. No.: 628,566

[22] Filed: Dec. 17, 1990

[30] Foreign Application Priority Data

Dec. 22, 1989 [JP] Japan ..... 1-334482

[51] Int. Cl.[5] ..... G03C 1/46

[52] U.S. Cl. ..... 430/508; 430/503; 430/570; 430/572; 430/587; 430/592

[58] Field of Search ..... 430/503, 508, 570, 572, 430/573, 592

[56] References Cited

U.S. PATENT DOCUMENTS

| | | | |
|---|---|---|---|
| 3,672,898 | 6/1972 | Schwan et al. | 430/508 |
| 4,663,271 | 5/1987 | Nozawa et al. | 430/503 |
| 4,686,175 | 8/1987 | Ogawa et al. | 430/505 |

FOREIGN PATENT DOCUMENTS

| | | |
|---|---|---|
| 115304 | 8/1984 | European Pat. Off. . |
| 160449 | 7/1987 | Japan . |

*Primary Examiner*—Robert L. Stoll

*Assistant Examiner*—Joseph D. Anthony

*Attorney, Agent, or Firm*—Bierman and Muserlian

[57] ABSTRACT

A silver halide color photographic light-sensitive material comprising a support having thereon a blue-sensitive silver halide emulsion layer, a green-sensitive silver halide emulsion layer and a red-sensitive silver halide emulsion layer, wherein a maximum sensitivity wavelength $\lambda_R$ of a spectral sensitivity distribution of said red-sensitive silver halide emulsion layer is in a range of 595 nm$\leqq\lambda_R\leqq$625 nm;

a maximum sensitivity wavelength $\lambda_G$ of a spectral sensitivity distribution of said green-sensitive silver halide emulsion layer is in a range of 530 nm$\leqq\lambda_G\leqq$560 nm; and a sensitivity of said green-sensitive silver halide emulsion layer at 500 nm is not less than one-fourth of the sensitivity at the maximum sensitivity wavelength $\lambda_G$.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COLOR PHOTOGRAPHIC LIGHT-SENSITIVE MATERIAL EXCELLENT IN COLOR REPRODUCTION

FIELD OF THE INVENTION

The present invention relates to a color photographic light-sensitive material, particularly to a color photographic light-sensitive material having a high saturation and an excellent hue reproduction.

BACKGROUND OF THE INVENTION

In recent years, a marked improvement has been made in image quality of silver halide multi-layered color photographic light-sensitive materials.

That is, graininess, sharpness and color reproducibility, which are integral parts of the three elements of image quality, are on substantially high levels in recent color photographic light-sensitive materials. In an ordinary color photography, for example, it seems that customers do not complain much of the quality of color prints or slidefilms they obtain.

In the color reproducibility among the three elements, however, color purity has being improved, but colors which are conventionally regarded to be hard to reproduce in photography still remain unimproved; that is, the color reproducibility has problems for solution still now. For example, purple and bluish purple which reflect a ray having a wavelength larger than 600 nm, or green-based colors such as bluish green and yellowish green, are occasionally reproduced in a color quite different from the original, disappointing users of their expectations.

A spectral sensitivity distribution and an interimage effect are decisive factors in the color reproduction.

With respect to the interimage effect, it is known to add a so-called DIR compound which forms a developing inhibitor or a precursor thereof upon reaction with an oxidation product of a color developing agent, to a silver halide multi-layered color photographic light-sensitive material. In this case, a developing inhibitor released from such a DIR compound inhibits developing of other color forming layers and thereby produces an interimage effect to improve the color reproduction.

In a color negative film, the same effect as the interimage effect can be achieved by adding a colored coupler in an amount larger than that necessary to offset useless absorptions.

However, using an excessive amount of a colored coupler causes a minimum optical density of a film to increase; this makes it difficult to form a proper judgement on the correction of color or optical density of print, thereby deterioration in color quality of print is liable to occur.

Meanwhile, these techniques contribute particularly to the enhancement of color purity in the color reproduction. A so-called diffusible DIR compound, which is frequently used in recent years and whose inhibiting group and precursor have large mobilities, contributes greatly to improvement in color purity. But, the interimage effect is difficult to be controlled in a proper direction, thereby it is liable to cause a trouble of changing a color, though it can raise the color purity (directional control of the interimage effect is described in U.S. Pat. No. 4,725,529).

With regard to the spectral sensitivity distribution, U.S. Pat. No. 3,672,898 discloses a spectral sensitivity distribution appropriate to mitigate a fluctuation in color reproduction caused by a difference in light sources at photographing. But, this is not good enough to improve the foregoing poor-reproducible colors.

As known in the photographic art, color reproductions of bluish purple and purple can be improved by shifting a spectral sensitivity distribution in a red-sensitive layer to a shorter wavelength region. This technique is described in Japanese Patent Publication Open to Public Inspection Nos. 20926/1978 and 131937/1984, but the methods described therein have a couple of shortcomings such as an insufficient color reproduction for purple of the primal object and lowering in color purity of skin color, a fatal drawback for a photographic material.

A combination of a spectral sensitivity distribution and an interimage effect is disclosed in Japanese Patent O.P.I. Publication No. 34541/1986, in which an attempt is made to improve the foregoing poor-reproducible colors and seems to produce an effect to some extent. Its typical embodiment is to exercise an interimage effect not only from a centroidal wavelength of each of blue-sensitive, green-sensitive and red-sensitive layers as performed in conventional methods, but also from wavelengths other than the centroid of each color sensitive layer.

Though this technique seems to be effective in improving reproductions of specific colors to some extent, it costs too much, because of an increased amount of silver consumption owing to necessity for providing an interimage effect producing layer besides primary blue-sensitive, green-sensitive and red-sensitive layers as well as necessity for another type of light-sensitive silver halide, in addition to a high production cost due to increase in the number of processes. Moreover, the effect is not good enough.

SUMMARY OF THE INVENTION

The object of the present invention is to provide a silver halide color photographic light-sensitive material capable of faithfully reproducing bluish purple, bluish green and green without impairing reproduction of skin color.

The present inventors have made an intensive study and found that the object of the invention can be achieved by the following constitution:

A color photographic light-sensitive material having on a support at least one layer each of blue-sensitive silver halide emulsion layer (hereinafter occasionally referred to as a blue-sensitive layer), green-sensitive silver halide emulsion layer (hereinafter occasionally referred to as a green-sensitive layer) and red-sensitive silver halide emulsion layer (hereinafter occasionally referred to as a red-sensitive layer), wherein a maximum sensitivity wavelength $\lambda_R$ in a spectral sensitivity distribution of said red-sensitive is in a range of $$595\ \text{nm} \leqq \lambda_R \leqq 625\ \text{nm}$$

and a maximum sensitivity wavelength $\lambda_G$ of a spectral sensitivity distribution of said green-sensitive silver halide emulsion layer is in a range of $$530\ \text{nm} \leqq \lambda_G \leqq 560\ \text{nm},$$

and a sensitivity of said green-sensitive layer at 500 nm is larger than one-fourth the sensitivity at the maximum sensitivity wavelength $\lambda_G$.

DETAILED DESCRIPTION OF THE INVENTION

Figure 1:
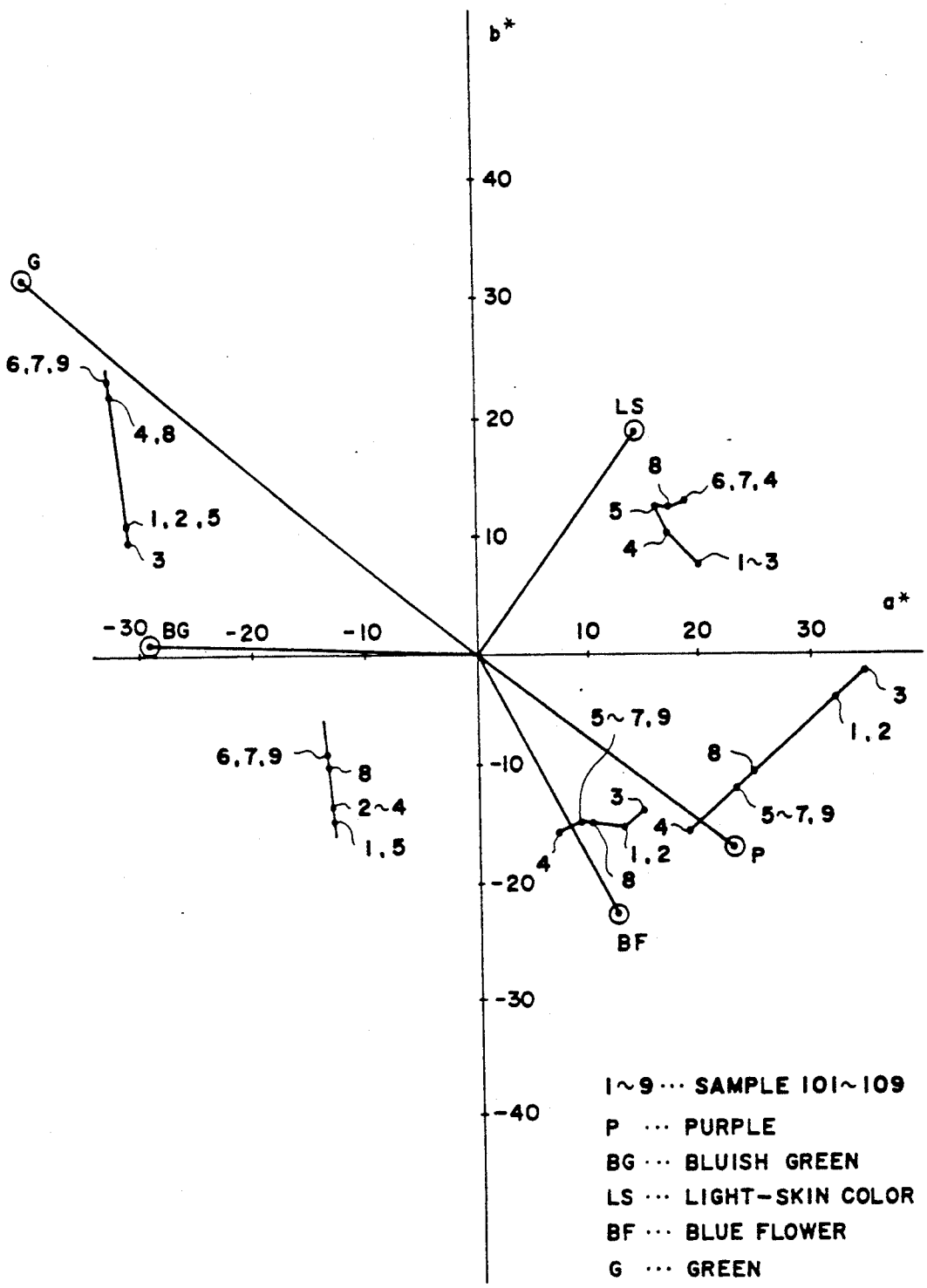
FIG. 1 is a chart showing color reproductions of the samples on the (a*, b*) plane of the (L*, a*, b*) color system.

The present invention will be explained in detail below.

In the spectral sensitivity distribution of the invention, the spectral sensitivity is shown as a function of a wavelength; that is, when a light-sensitive material is exposed to a spectral light from 400 nm to 700 nm at intervals of several nanometers, on the basis of the exposure to give a prescribed density at each wavelength is evaluated a sensitivity of said wavelength.

In the invention, a proper measure can be arbitrarily taken to obtain the foregoing inventive spectral sensitivity distribution in red-sensitive and green-sensitive layers. Use of a spectral sensitizing dye, for example, provides such a spectral sensitivity distribution. Types of spectral sensitizing dyes used in these layers are not limited, but good results can be obtained by using the following spectral sensitizing dyes in combination.

That is, though the spectral sensitivity distribution of a red-sensitive layer can be brought into that specified in the present invention by various means, but such a spectral sensitivity distribution is preferably achieved by a red-sensitive emulsion spectrally sensitized by a combined use of at least one of the sensitizing dyes represented by Formula (I) and at least one of the sensitizing dyes represented by Formula (II) or (III).

Formula (I)

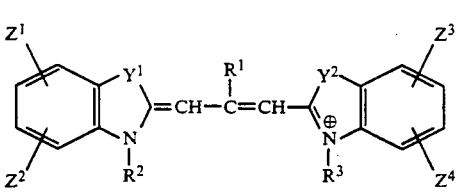

$(X_1)_{m-1}$ wherein $R^1$ represents a hydrogen atom, an alkyl group or an aryl group; $R^2$ and $R^3$ individually represent an alkyl group; $Y^1$ and $Y^2$ individually represent a sulfur atom or a selenium atom; $Z^1$, $Z^2$, $Z^3$ and $Z^4$ individually represent a hydrogen atom, a halogen atom, a hydroxyl group, an alkoxy group, an amino group, an acyl group, an acylamino group, an acyloxy group, an alkoxycarbonyl group, an aryl group, an aryloxy group, an aryloxycarbonyl group, a sulfonyl group, a carbamoyl group, an alkyl group or a cyano group, $Z^1$ and $Z^2$ and/or $Z^3$ and $Z^4$ may bond with each other to form a ring; $X_1$ represents a cation; and m represents an integer of 1 or 2, or represents 1 provided that the sensitizing dye forms an intramolecular salt.

Formula (II)

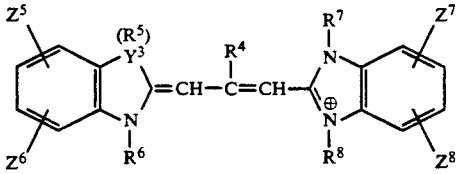

$(X_2)_{n-1}$ wherein $R^4$ represents a hydrogen atom, an alkyl group or an aryl group; $R^5$, $R^6$, $R^7$ and $R^8$ individually represent an alkyl group; $Y^3$ represents a nitrogen atom, a sulfur atom or a selenium atom, and no $R^5$ exists when $Y^3$ is a sulfur or selenium atom; $Z^5$, $Z^6$, $Z^7$ and $Z^8$ individually represent a hydrogen atom, a halogen atom, a hydroxyl group, an alkoxy group, an amino group, an acyl group, an acylamino group, an acyloxy group, an aryloxy group, an alkoxycarbonyl group, an aryloxycarbonyl group, an alkoxycarbonylamino group, a carbamoyl group, an aryl group, an alkyl group, a cyano group, or a sulfonyl group, $Z^5$ and $Z^6$ and/or $Z^7$ and $Z^8$ may bond with each other to form a ring; $X_2$ represents a cation; and n represents an integer of 1 or 2, or represents 1 provided that the sensitizing dye forms an intramolecular salt.

Formula (III)

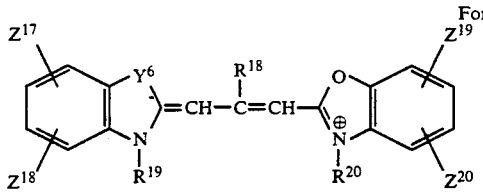

$(X^5)_{Q-1}$ wherein $Y^5$ represents a sulfur atom or a selenium atom; $R^{18}$ represents a hydrogen atom, a lower alkyl group (e.g., methyl, ethyl and propyl) or an aryl group (e.g., phenyl); $R^{19}$ and $R^{20}$ individually represent a lower alkyl group (e.g., methyl, ethyl, butyl, and an alkyl group having a substituent such as sulfoethyl, carboxypropyl or sulfobutyl); $Z^{17}$, $Z^{18}$, $Z^{19}$ and $Z^{20}$ individually represent a hydrogen atom, a halogen atom (e.g., chlorine, bromine, iodine and fluorine), a hydroxyl group, an alkoxy group (e.g., methoxy, ethoxy, propoxy and butoxy), an amino group (e.g., amino, methylamino, dimethylamino and diethylamino), an acylamino group (e.g., acetamide and propionoxy), an alkoxycarbonyl group (e.g., ethoxycarbonyl and propoxycarbonyl) an alkoxycarbonylamino group (e.g., ethoxycarbonylamino and propoxycarbonylamino), an aryl group (e.g., phenyl), a lower alkyl group (e.g., methyl, ethyl and propyl), $Z^{17}$ and $Z^{18}$ and/or $Z^{19}$ and $Z^{20}$ may bond with each other to form a ring such as a benzene ring; $X^5$ represents a cation; and Q represents an integer of 1 or 2, or represents 1 provided that the sensitizing dye forms an intramolecular salt.

Typical sensitizing dyes used in the invention and represented by Formulas (I), (II) and (III) are exemplified below, but the scope of the invention is not limited to them. Among these compounds, (I-1) through (I-46) are those represented by Formula (I), (II-1) through (II-56) are those represented by Formula (II), and (III-1) through (III-12) are those represented by Formula (III).

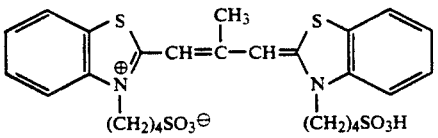
(I-1)
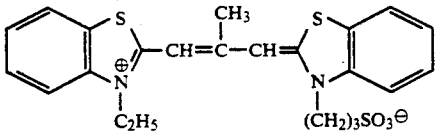
(I-2)
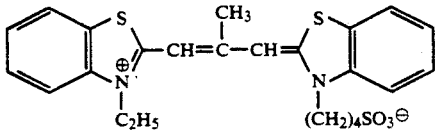
(I-3)
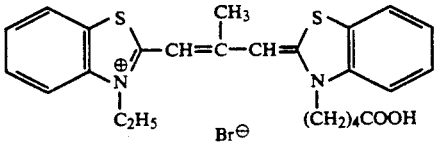
(I-4)
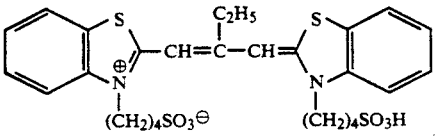
(I-5)
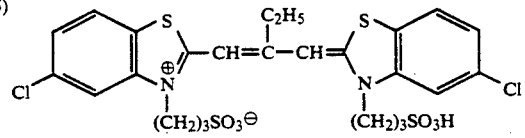
(I-6)
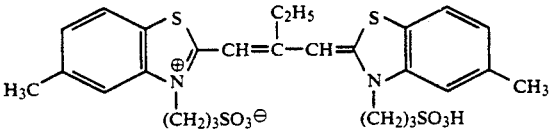
(I-7)
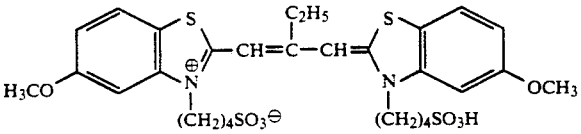
(I-8)
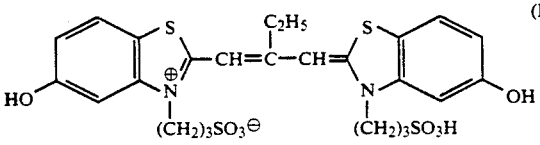
(I-9)
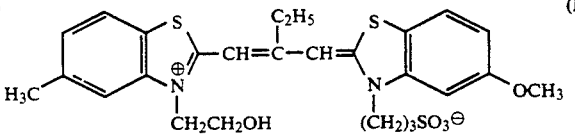
(I-10)
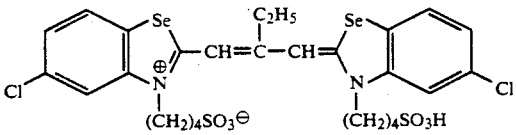
(I-11)
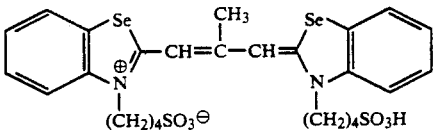
(I-12)
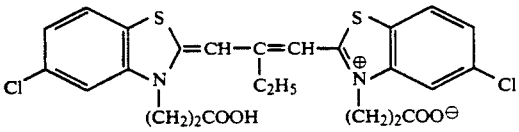
(I-13)
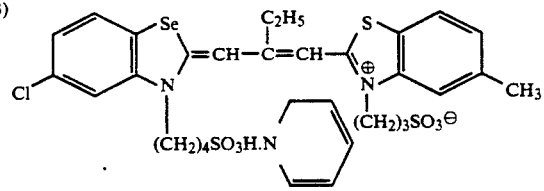
(I-14)
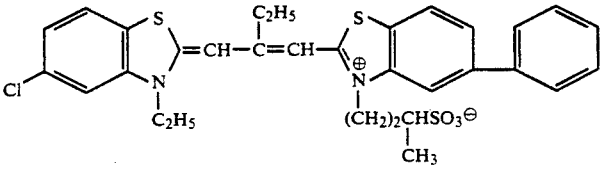
(I-15)

-continued
(I-16)
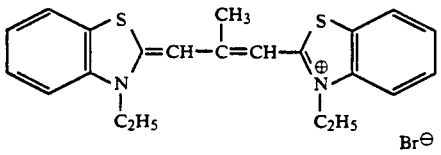
(I-17)
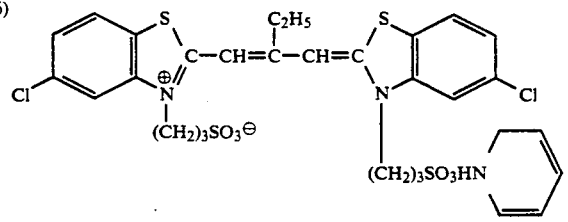
(I-18)
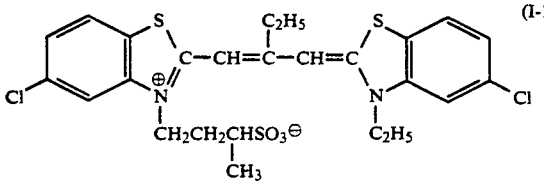
(I-19)
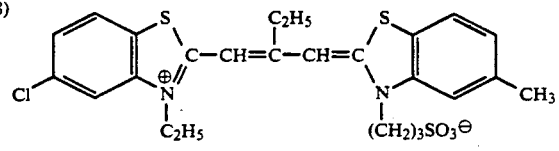
(I-20)
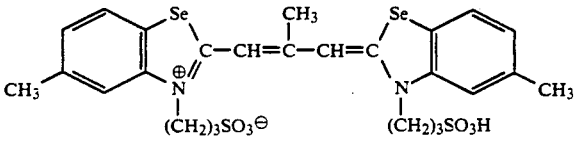
(I-21)
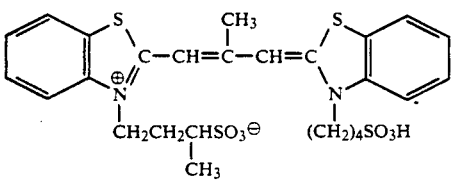
(I-22)
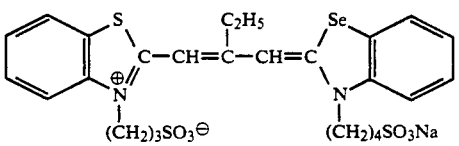
(I-23)
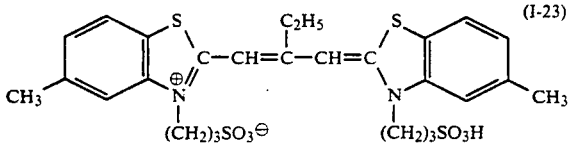
(I-24)
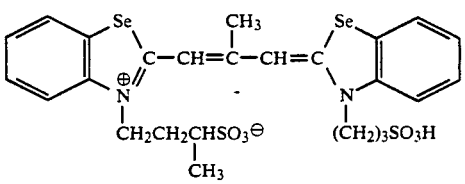
(I-25)
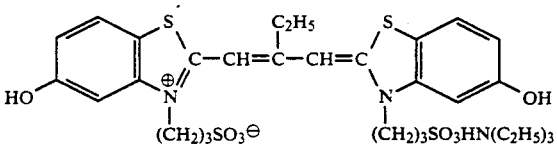
(I-26)
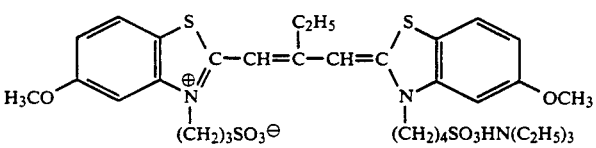
(I-27)
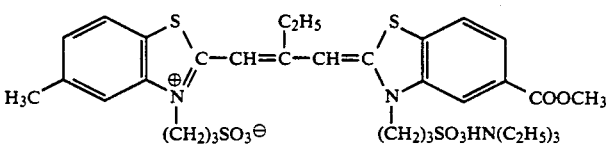
(I-28)
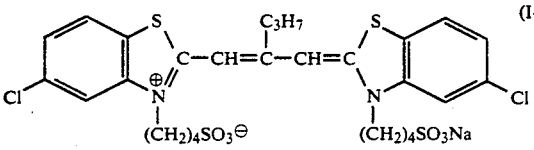
(I-29)
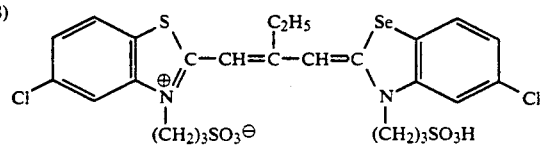

-continued
(I-30)
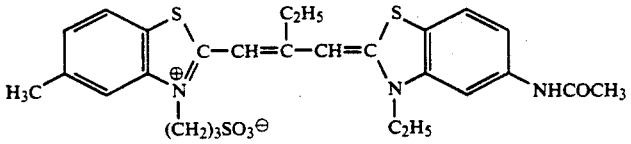
(I-31)
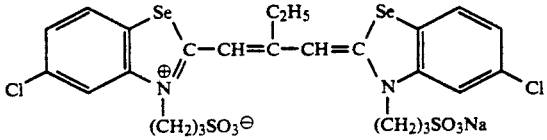
(I-32)
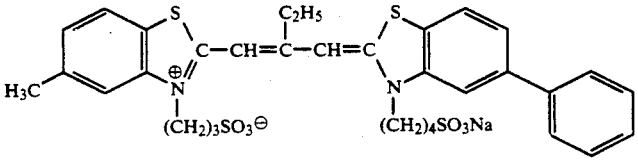
(I-33)
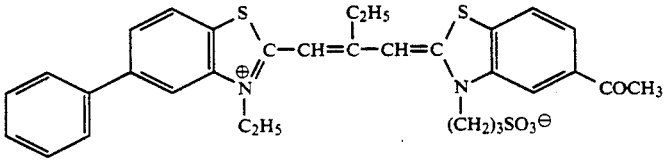
(I-34)
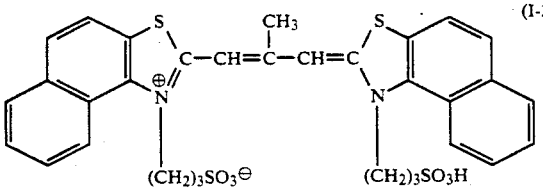
(I-35)
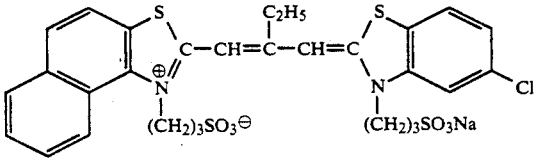
(I-36)
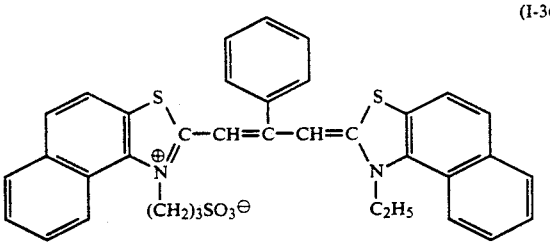
(I-37)
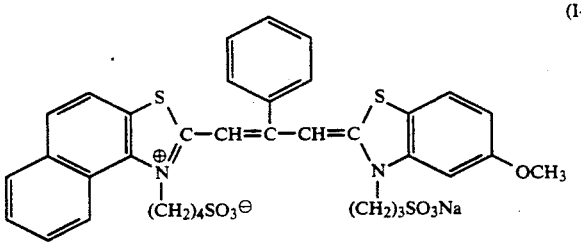
(I-38)
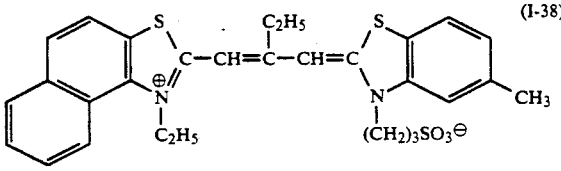
(I-39)
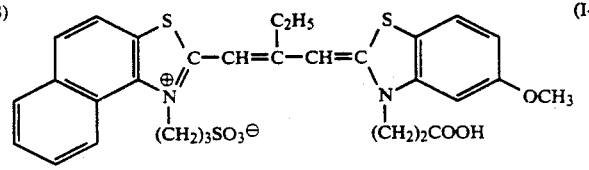
(I-40)
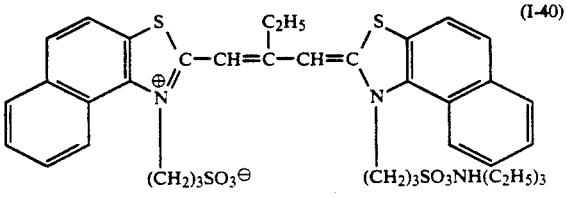
(I-41)
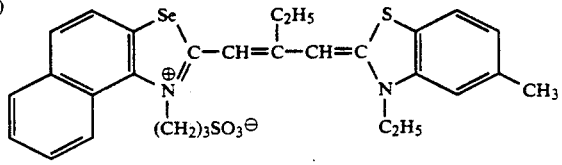

-continued
(I-42)
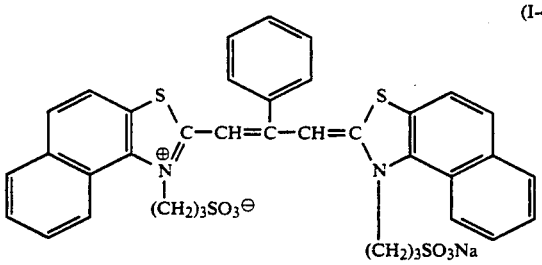
(I-43)
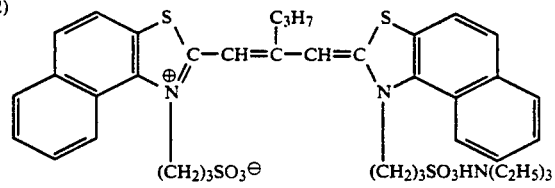
(I-44)
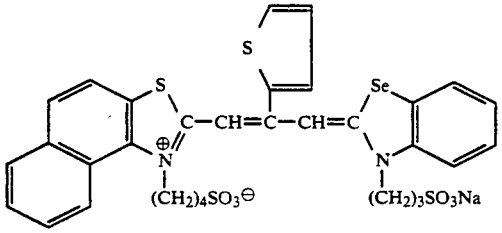
(I-45)
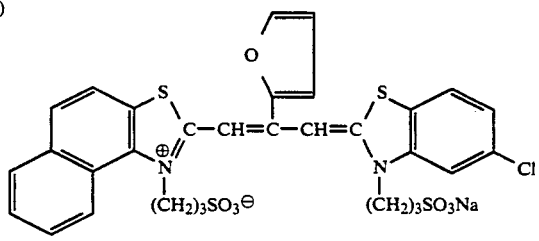
(I-46)
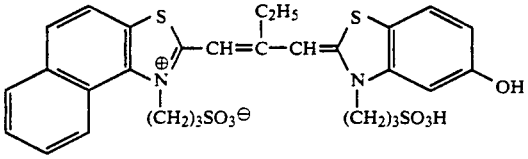
(II-1)
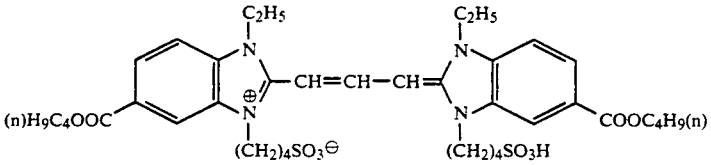
(II-2)
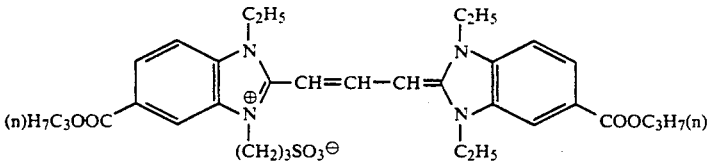
(II-3)
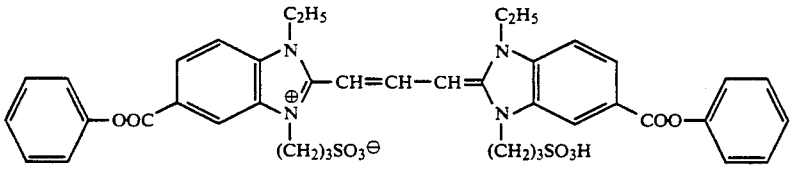
(II-4)
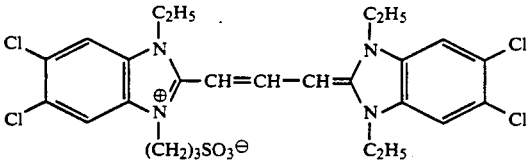
(II-5)
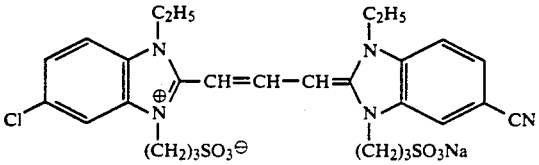

-continued
(II-6)
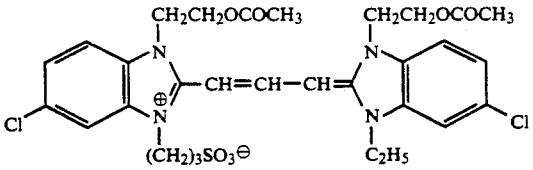
(II-7)
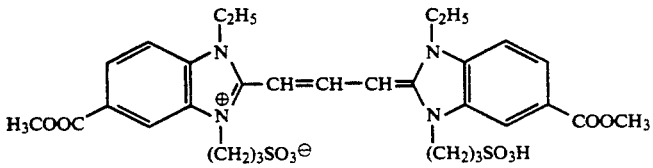
(II-8)
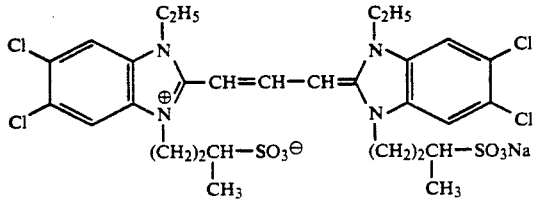
(II-9)
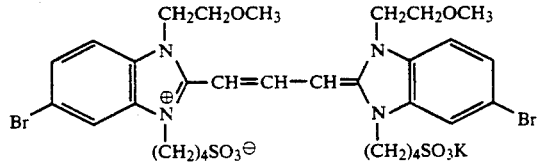
(II-10)
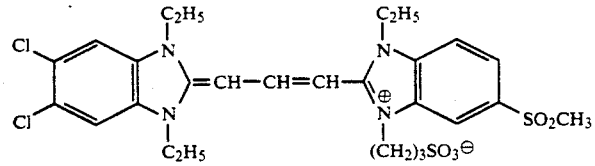
(II-11)
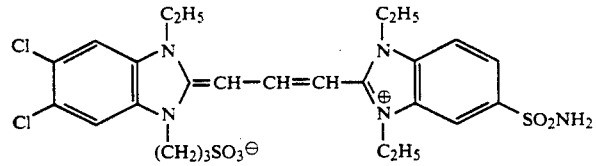
(II-12)
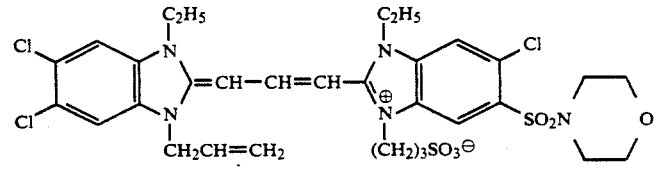
(II-13)
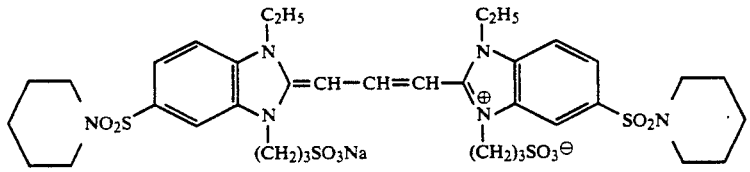
(II-14)
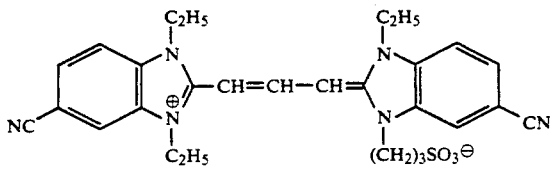

-continued
(II-15)
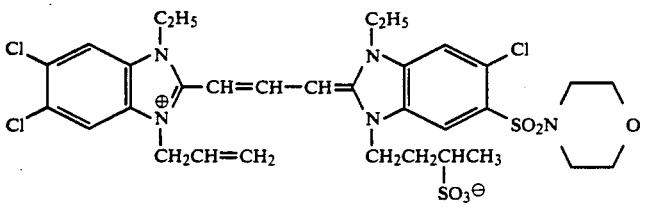
(II-16)
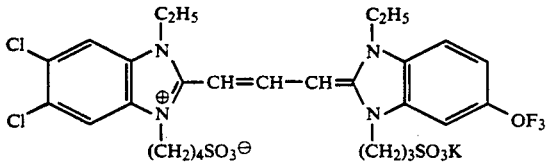
(II-17)
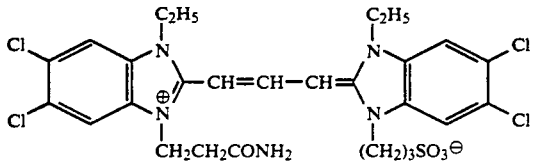
(II-18)
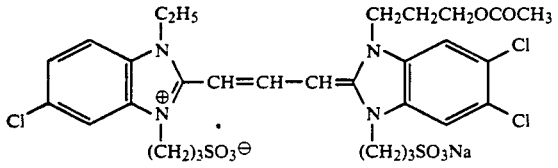
(II-19)
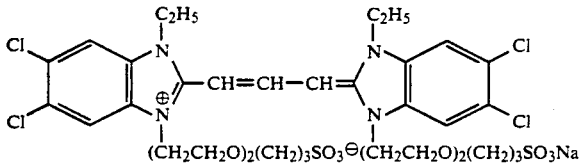
(II-20)
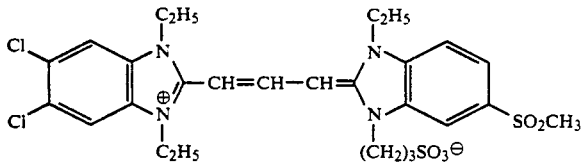
(II-21)
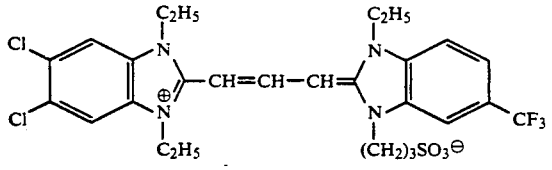
(II-22)
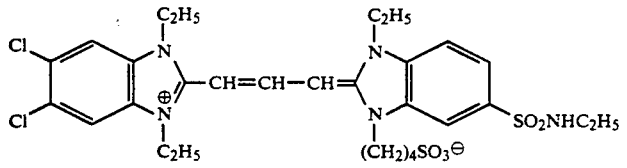
(II-23)
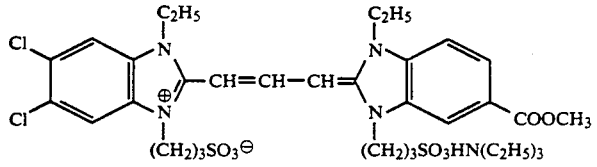

-continued
(II-24)
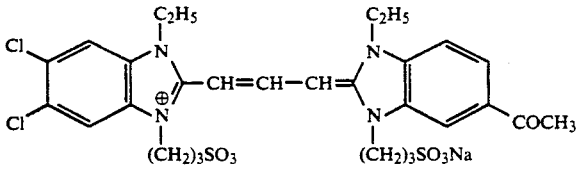
(II-25)
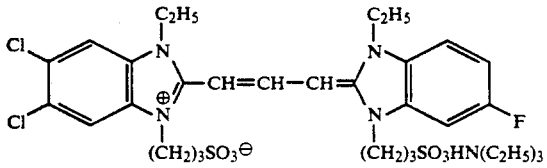
(II-26)
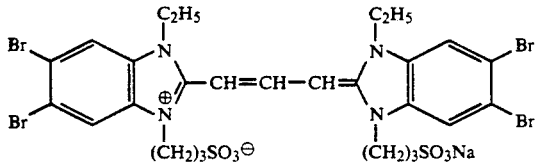
(II-27)
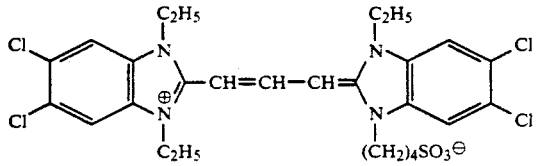
(II-28)
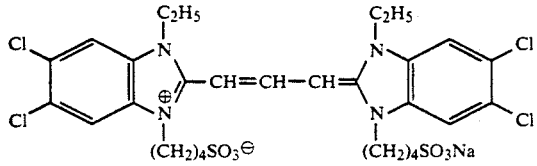
(II-29)
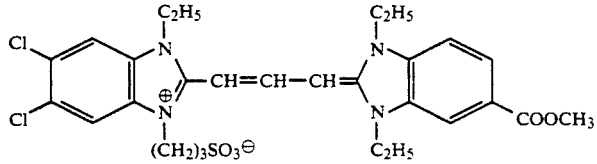
(II-30)
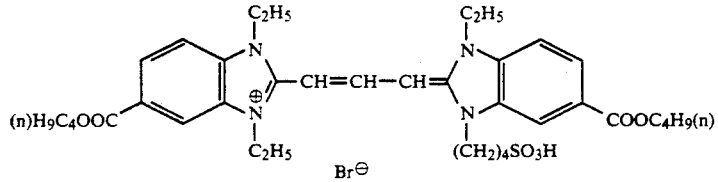
(II-31)
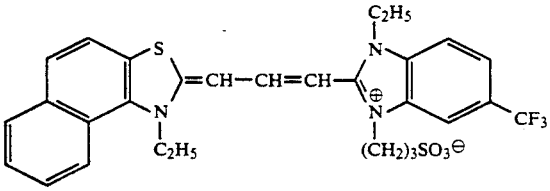
(II-32)
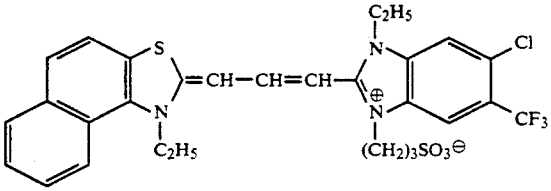

-continued
(II-33)
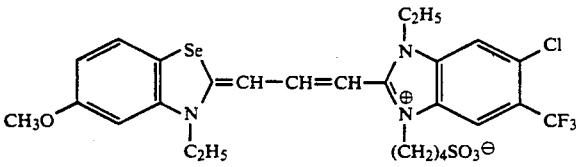
(II-34)
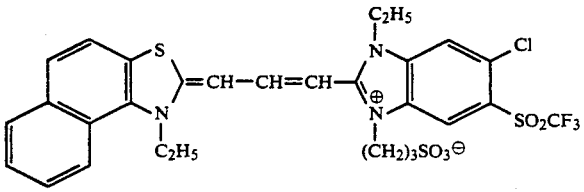
(II-35)
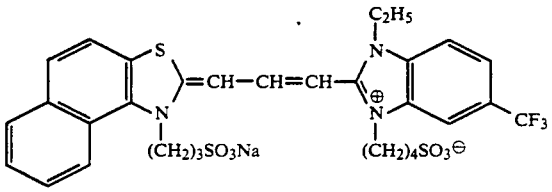
(II-36)
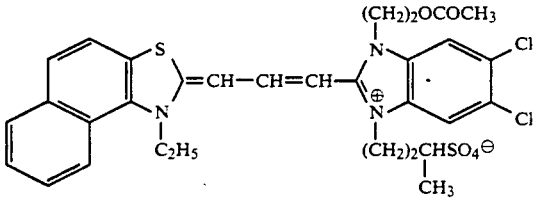
(II-37)
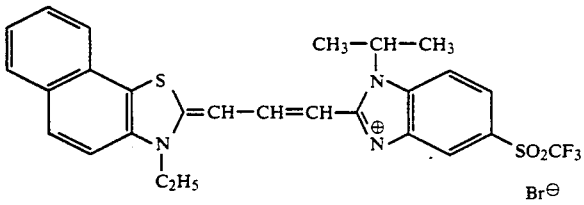
(II-38)
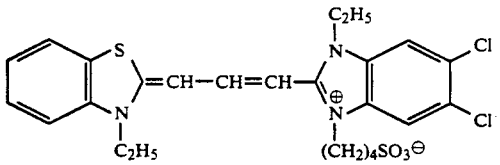
(II-39)
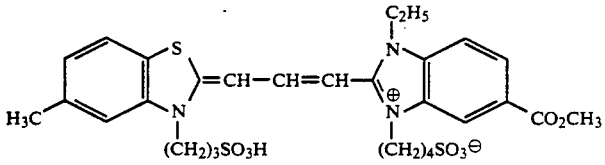
(II-40)
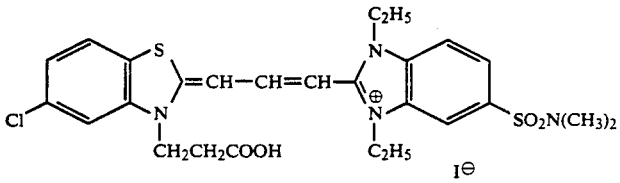

-continued
(II-41)
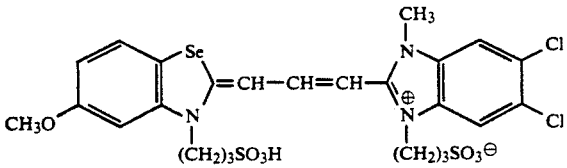
(II-42)
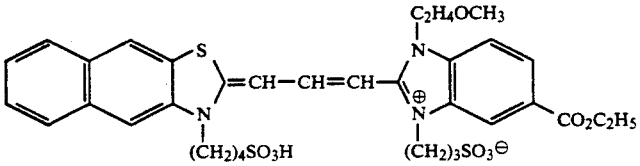
(II-43)
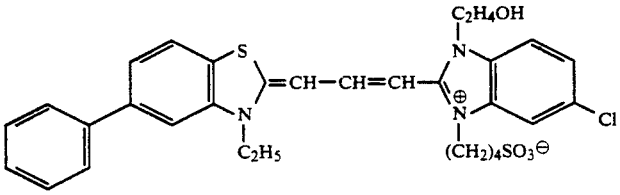
(II-44)
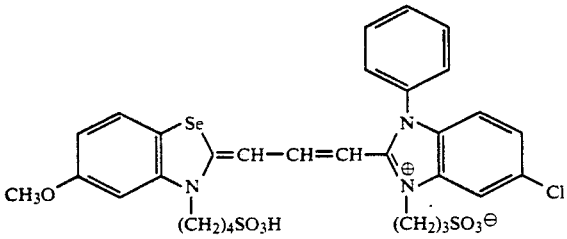
(II-45)
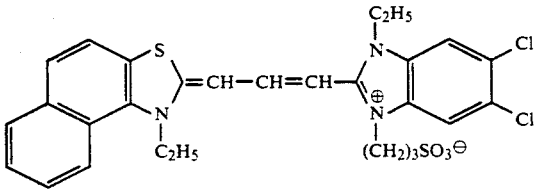
(II-46)
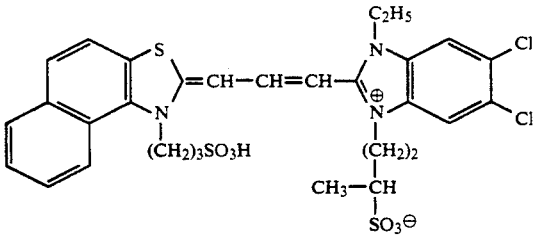
(II-47)
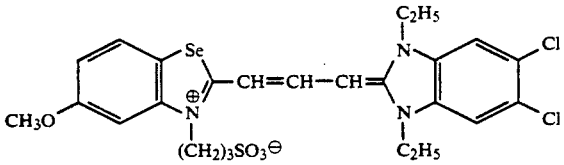
(II-48)
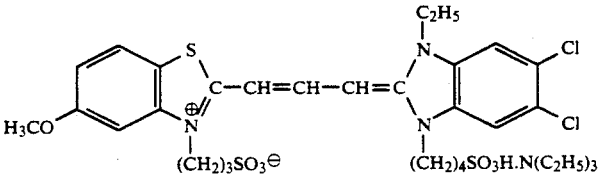

-continued
(II-49)
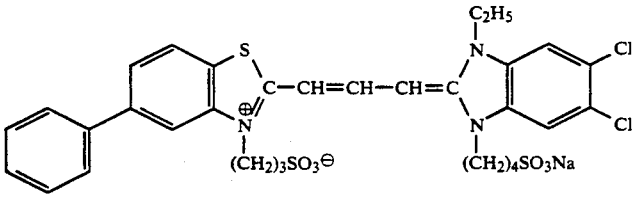
(II-50)
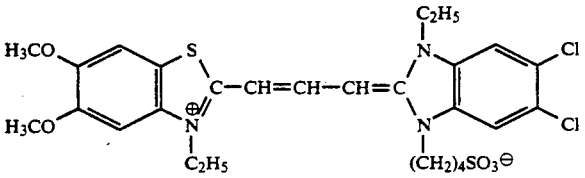
(II-51)
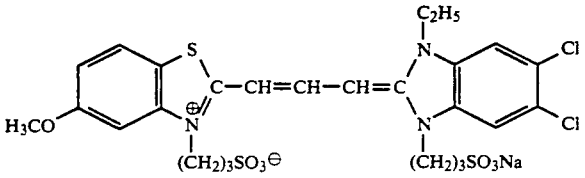
(II-52)
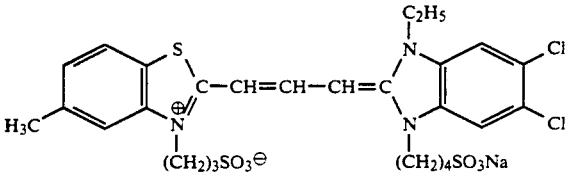
(II-53)
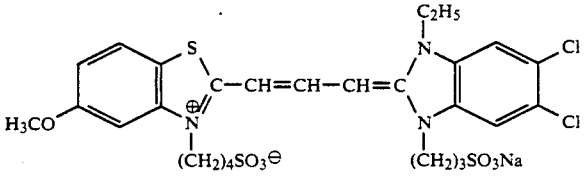
(II-54)
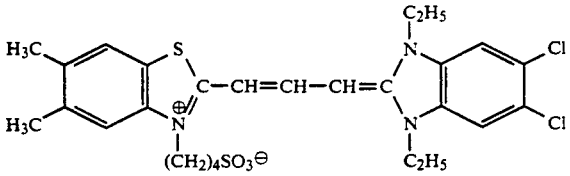
(II-55)
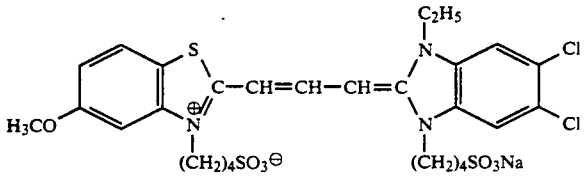
(II-56)
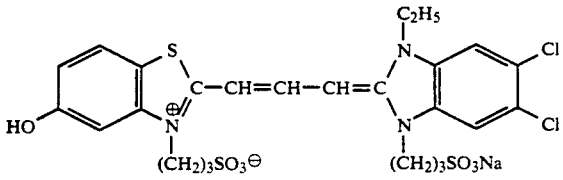

-continued
(II-57)
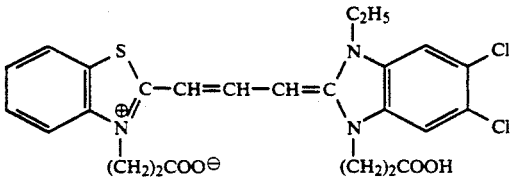
(II-58)
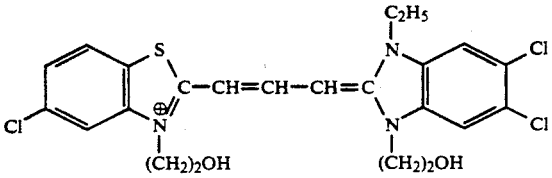
(III-1)
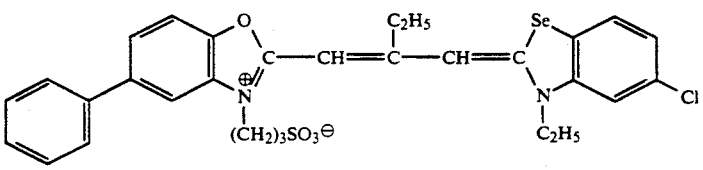
(III-2)
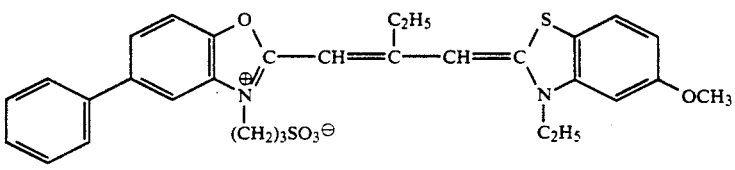
(III-3)
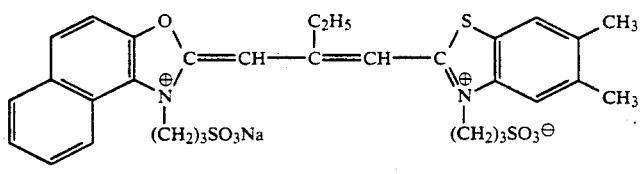
(III-4)
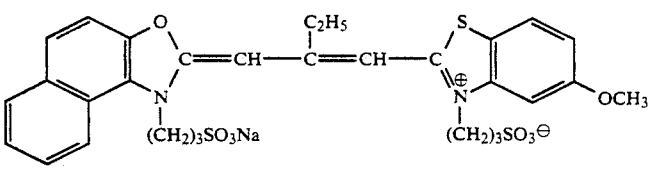
(III-5)
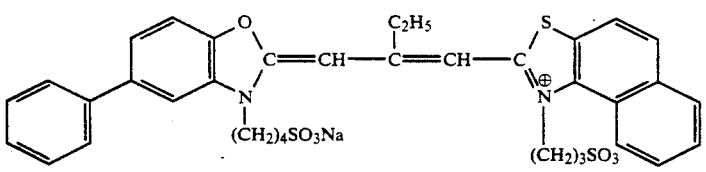
(III-6)
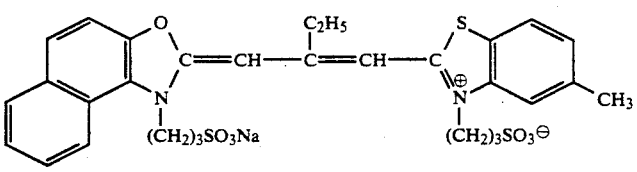
(III-7)
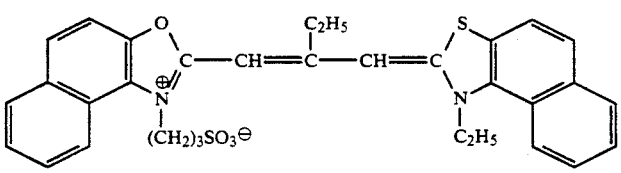

-continued

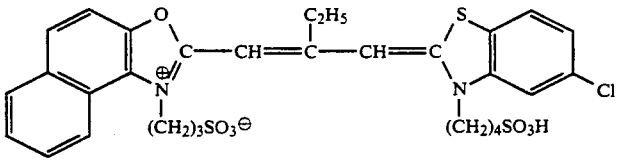
(III-8)

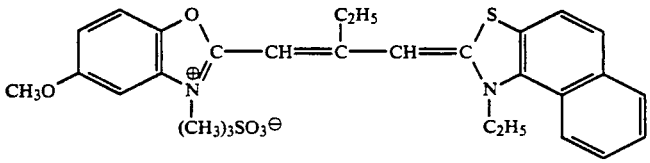
(III-9)

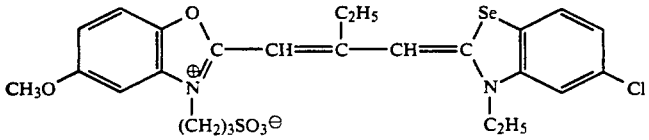
(III-10)

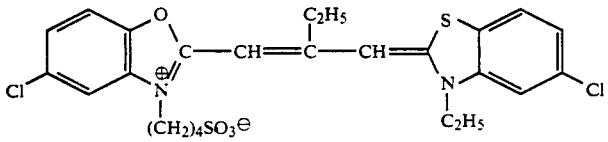
(III-11)

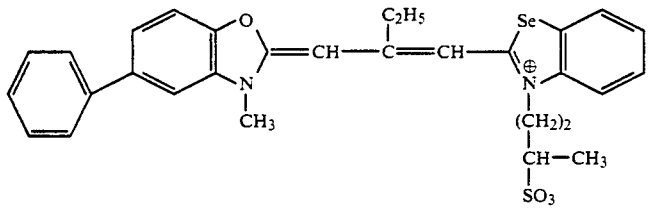
(III-12)

Besides sensitizing dyes represented by Formulas (I), (II) and (III), supersensitizers such as benzothiazoles and quinolines described in Japanese Patent Examined Publication No. 24533/1982 and quinoline derivatives described in Japanese Patent Examined Publication No. 24899/1982 may be used according to a specific requirement.

In combining red-sensitive sensitizing dyes, it is preferred to use at least one sensitizing dye represented by Formula (I) and at least one sensitizing dye represented by Formula (II). Further, it is preferred in this combination that $Y^1$ and $Y^2$ in the sensitizing dye represented by Formula (I) be sulfur atoms and that $Y^3$ in the sensitizing dye represented by Formula (II) be N-$R^a$, wherein N represents a nitrogen atom and $R^a$ represents an alkyl group.

Further, the green-sensitive layer is brought into the foregoing spectral sensitivity distribution of the invention by adding the following sensitizing dyes singly or in combination. The followings are examples of sensitizing dyes usable in the green-sensitive layer, but useful sensitizing dyes are not limited to them.

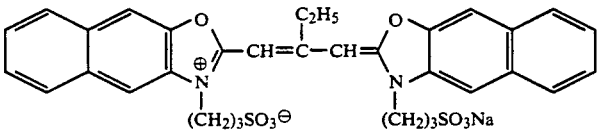
OD-1

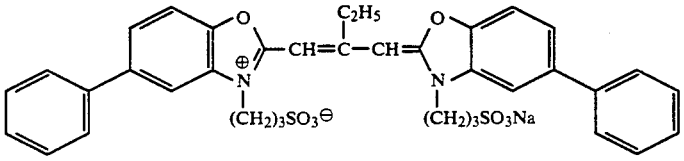
OD-2

-continued
OD-3
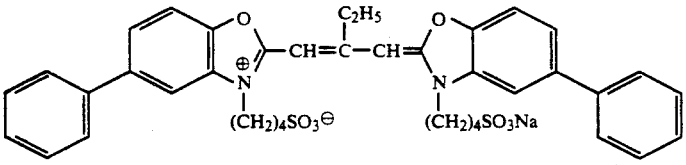
OD-4
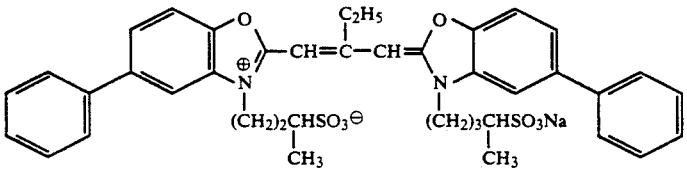
OD-5
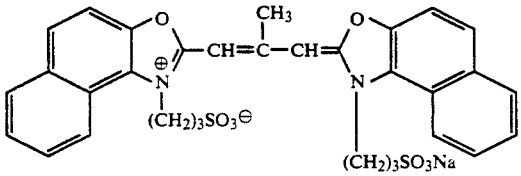
OD-6
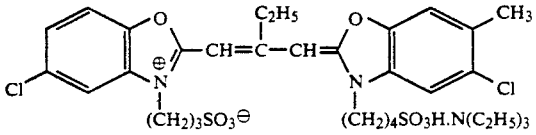
OD-7
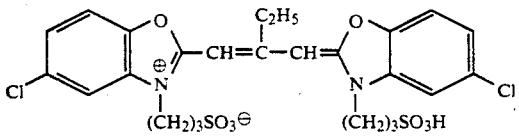
OD-8
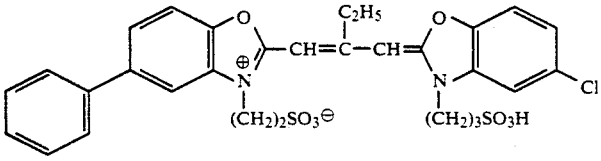
OD-9
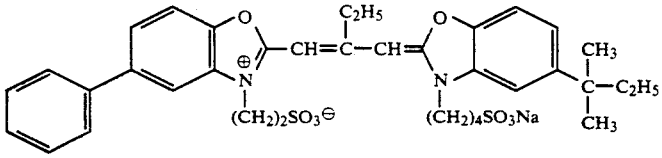
OD-10
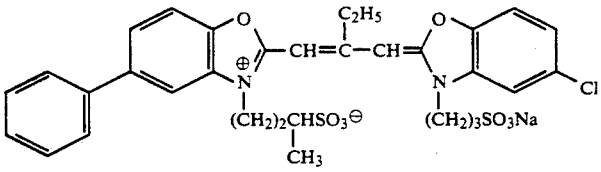
OD-11
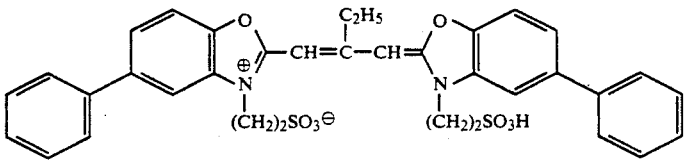

-continued
OD-12
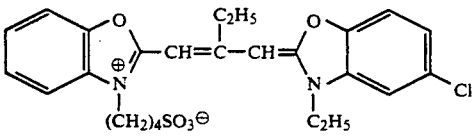
OD-13
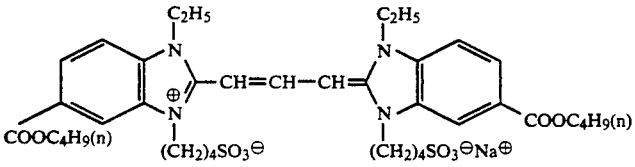
OD-14
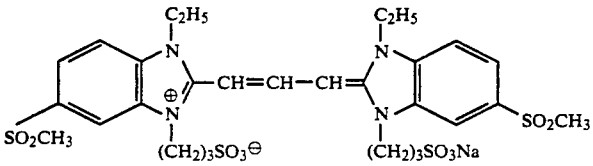
OD-15
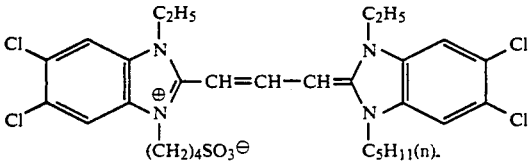
OD-16
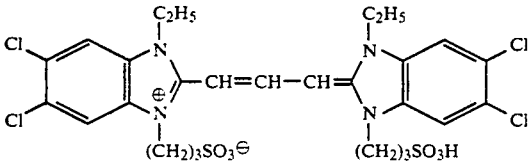
OD-17
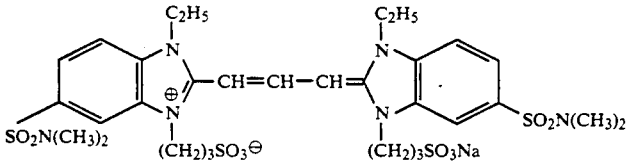
OD-18
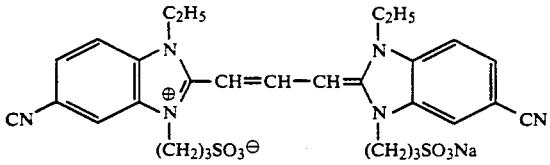
OD-19
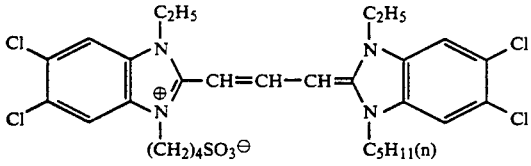
OD-20
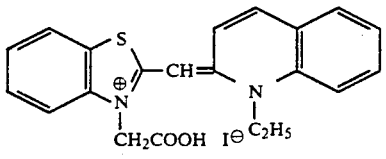

-continued

OD-21

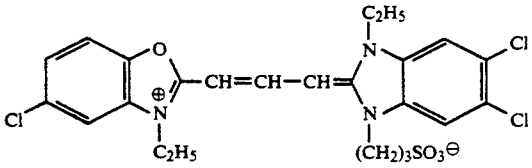

OD-22

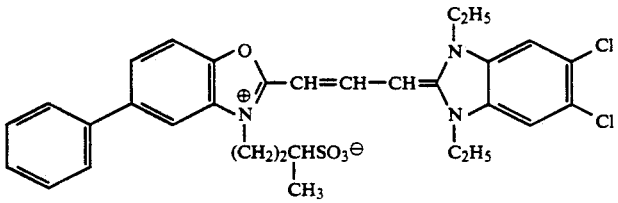

A silver halide emulsion used in a color photographic light-sensitive material of the invention can be chemically sensitized by a conventional manner.

An antifogging agent and a stabilizer may be added to the silver halide emulsion. As a binder for said emulsion, gelatin is favorably used (but not limited to gelatin).

Emulsion layers and other hydrophilic layers may be hardened, and may contain a plasticizer and a latex of water-soluble or scarcely soluble synthetic polymer.

The present invention can be preferably applied to color negative films and color reversal films.

In an emulsion layer of a color photographic light-sensitive material of the invention, a color forming coupler is generally used.

Further, there may be arbitrarily used a colored coupler having a correction effect, a competitive coupler and a chemical substance which releases a photographically useful fragment such as a developing accelerator, bleaching accelerator, developer, antifogging agent, chemical sensitizer, spectral sensitizer or desensitizer, upon coupling with an oxidation product of a developing agent.

The light-sensitive material may have auxiliary layers such as a filter layer, anti-halation layer and anti-irradiation layer. There may be contained in these auxiliary layers or emulsion layers a dye which is washed away or bleached out in the developing process.

The light-sensitive material may also contain a formalin scavenger, brightening agent, matting agent, slipping agent, image stabilizer, surfactant, antistain agent, developing accelerator, developing inhibitor and bleaching accelerator.

The support may be any of a paper laminated with polyethylene, polyethylene terephthalate film, baryta paper and triacetylcellulose film.

In forming dye images on a color light-sensitive material of the invention, conventional color-photographic processes can be applied after exposing.

EXAMPLES

The examples of the present invention will be described below, but the embodiments of the invention are not limited to these examples.

In the following examples, addition amounts to the silver halide light-sensitive material is shown by grams per 1 $m^2$ unless otherwise specified. Addition amounts of silver halide and colloidal silver are given in terms of silver.

EXAMPLE 1

The layers of the following compositions were formed in sequence on a triacetylcellulose film base to prepare the multi-layered color photographic light-sensitive material sample-101.

| Sample-101 (comparison) | |
|---|---|
| 1st layer: anti-halation layer (HC-1) | |
| Black colloidal silver | 0.20 |
| UV absorbent (UV-1) | 0.20 |
| High boiling solvent (Oil-1) | 0.20 |
| Gelatin | 1.5 |
| 2nd layer: intermediate layer (IL-1) | |
| UV absorbent (UV-1) | 0.04 |
| High boiling solvent (Oil-1) | 0.04 |
| Gelatin | 1.2 |
| 3rd layer: low speed red-sensitive emulsion layer (RL) | |
| Silver iodobromide emulsion (Em-1) | 0.6 |
| Silver iodobromide emulsion (Em-2) | 0.2 |
| Sensitizing dye (III)-11 | $2.2 \times 10^{-4}$ (mol/mol Ag) |
| Sensitizing dye (I)-6 | $2.2 \times 10^{-4}$ (mol/mol Ag) |
| Sensitizing dye (I)-34 | $0.44 \times 10^{-4}$ (mol/mol Ag) |
| Cyan coupler (C-1) | 0.65 |
| Colored cyan coupler (CC-1) | 0.12 |
| DIR compound (D-1) | 0.004 |
| DIR compound (D-2) | 0.013 |
| High boiling solvent (Oil-1) | 0.6 |
| Gelatin | 1.5 |
| 4th layer: high speed red-sensitive emulsion layer (RH) | |
| Silver iodobromide emulsion (Em-3) | 0.8 |
| Sensitizing dye (III)-11 | $1.2 \times 10^{-4}$ (mol/mol Ag) |
| Sensitizing dye (I)-6 | $1.2 \times 10^{-4}$ (mol/mol Ag) |
| Sensitizing dye (I)-34 | $0.1 \times 10^{-4}$ (mol/mol Ag) |
| Cyan coupler (C-2) | 0.16 |
| Cyan coupler (C-3) | 0.02 |
| Colored cyan coupler (CC-1) | 0.03 |
| DIR compound (D-2) | 0.016 |
| High boiling solvent (Oil-1) | 0.2 |
| Gelatin | 1.3 |
| 5th layer: intermediate layer (IL-2) | |
| Gelatin | 0.7 |
| 6th layer: low speed green-sensitive emulsion layer (GL) | |
| Silver iodobromide emulsion (Em-1) | 0.8 |
| Sensitizing dye (OD-1) | $3.0 \times 10^{-4}$ (mol/mol Ag) |
| Sensitizing dye (OD-2) | $5.0 \times 10^{-4}$ (mol/mol Ag) |
| Magenta coupler (M-1) | 0.2 |
| Magenta coupler (M-2) | 0.2 |
| Colored magenta coupler (CM-1) | 0.1 |
| DIR compound (D-3) | 0.02 |
| DIR compound (D-4) | 0.004 |
| High boiling solvent (Oil-2) | 0.4 |
| Gelatin | 1.0 |
| 7th layer: high speed green-sensitive emulsion layer (GH) | |
| Silver iodobromide emulsion (Em-3) | 0.9 |
| Sensitizing dye (OD-1) | $1.5 \times 10^{-4}$ (mol/mol Ag) |
| Sensitizing dye (OD-2) | $2.5 \times 10^{-4}$ (mol/mol Ag) |
| Magenta coupler (M-2) | 0.09 |
| Colored magenta coupler (CM-2) | 0.04 |
| DIR compound (D-3) | 0.006 |
| High boiling solvent (Oil-2) | 0.3 |
| Gelatin | 1.0 |

-continued

| Sample-101 (comparison) | |
|---|---|
| 8th layer: yellow filter layer (YC) | |
| Yellow colloidal silver | 0.1 |
| Antistain agent (SC-1) | 0.1 |
| High boiling solvent (Oil-3) | 0.1 |
| Gelatin | 0.8 |
| 9th layer: low speed blue-sensitive emulsion layer (BL) | |
| Silver iodobromide emulsion (Em-1) | 0.35 |
| Silver iodobromide emulsion (Em-2) | 0.10 |
| Sensitizing dye (SD-2) | $0.6 \times 10^{-3}$ (mol/mol Ag) |
| Yellow coupler (Y-1) | 0.6 |
| Yellow coupler (Y-2) | 0.1 |
| DIR compound (D-2) | 0.01 |
| High boiling solvent (Oil-3) | 0.3 |
| Gelatin | 1.0 |
| 10th layer: high speed blue-sensitive emulsion layer (BH) | |
| Silver iodobromide emulsion (Em-3) | 0.4 |
| Silver iodobromide emulsion (Em-1) | 0.1 |
| Sensitizing dye (SD-1) | $1 \times 10^{-4}$ (mol/mol Ag |
| Sensitizing dye (SD-2) | $0.3 \times 10^{-3}$ (mol/mol Ag) |
| Yellow coupler (Y-1) | 0.20 |
| Yellow coupler (Y-2) | 0.03 |
| High boiling solvent (Oil-3) | 0.07 |
| Gelatin | 1.1 |
| 11th layer: 1st protective layer (PRO-1) | |
| Fine particle silver iodobromide emulsion (average particle size: 0.08 μm, AgI: 12 mol %) | 0.2 |
| UV absorbent (UV-1) | 0.10 |
| UV absorbent (UV-2) | 0.05 |
| High boiling solvent (Oil-1) | 0.1 |
| High boiling solvent (Oil-4) | 0.1 |
| Formalin scavenger (HS-1) | 0.5 |
| Formalin scavenger (HS-2) | 0.2 |
| Gelatin | 1.0 |
| 12th layer: 2nd protective layer (PRO-2) | |
| Surfactant (SU-1) | |
| Alkali-soluble matting agent (average particle size: 2 μm) | 0.05 |
| Polymethylmethacrylate (average particle size: 3 μm) | 0.05 |
| Slipping agent (WAX-1) | 0.04 |
| Gelatin | 0.5 |

In addition to the above compounds, a coating aid Su-2, dispersants Su-3 and Su-4, hardeners H-1 and H-2, a stabilizer ST-1 and antifogging agents AF-1 ($\overline{Mw}$: 10,000) and AF-2 ($\overline{Mw}$: 1,100,000) were added.

The emulsions used in preparing the above samples are as follows:

Em-1

Average grain size: 0.50 μm

Average silver iodide content: 6.0 mol %

A core/shell type monodispersed silver iodobromide emulsion (extent of distribution: 18%) having a silver iodide content of 2 mol % in the outer portion of the grain Em-2

Average grain size: 0.25 μm

Average silver iodide content: 6.0 mol %

A core/shell type monodispersed silver iodobromide emulsion (extent of distribution: 18%) having a silver iodide content of 0.5 mol % in the outer portion Em-3

Average grain size: 0.85 μm

Average silver iodide content: 7.0 mol %

A core/shell type monodispersed silver iodobromide emulsion (extent of distribution: 16%) having a silver iodide content of 1 mol % in the outer portion wherein $$\text{Extent of distribution} = \frac{\text{Standard deviation}}{\text{Average grain size}} \times 100$$

The compounds used in the above samples are as follows:

SD-1

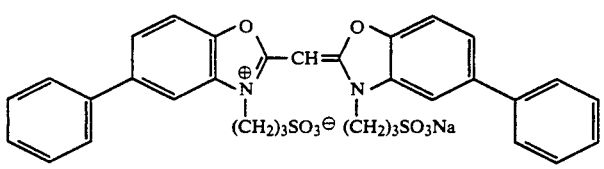

SD-2

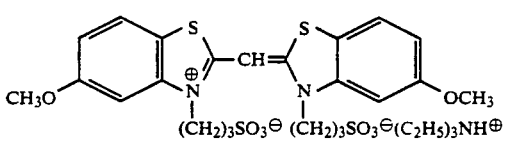

C-1

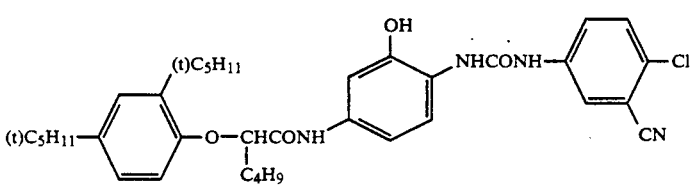

-continued
C-2
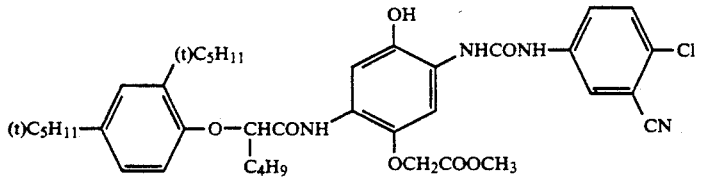
C-3
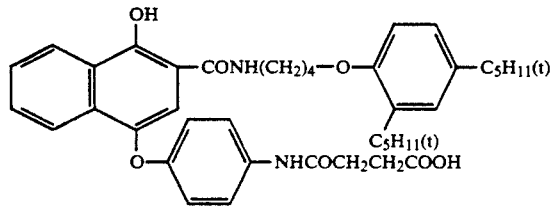
M-1
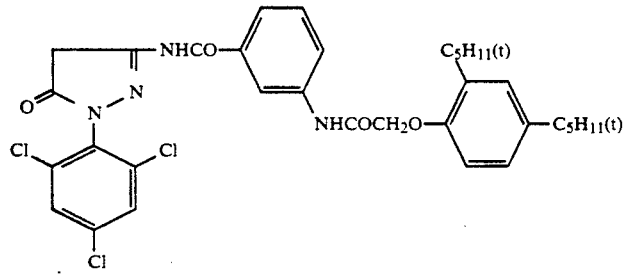
M-2
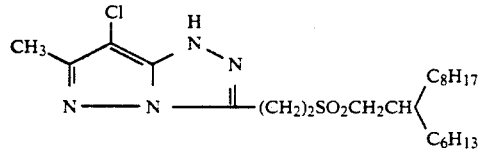
Y-1
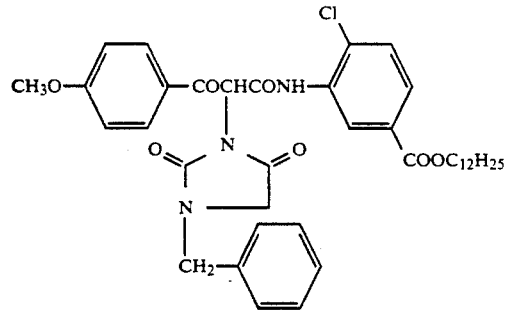
Y-2
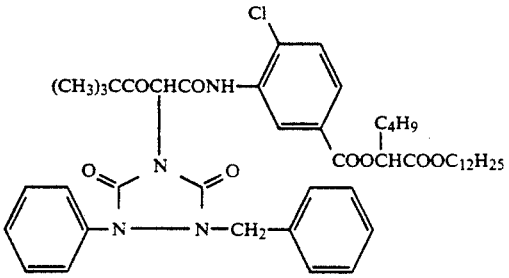

-continued
CC-1
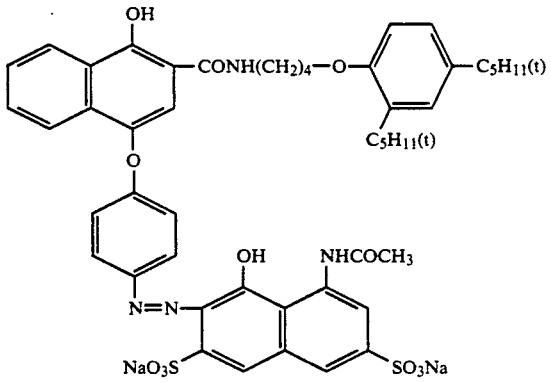
CM-1
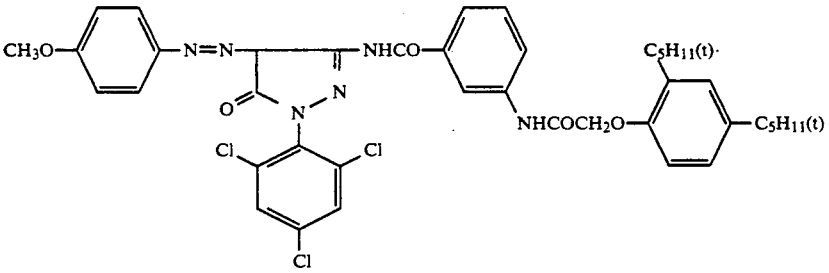
CM-2
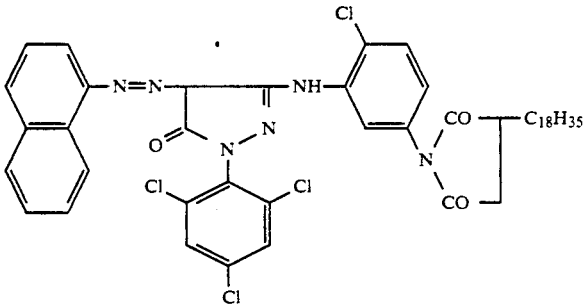
D-1
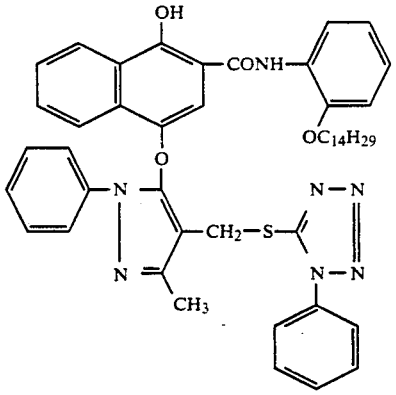
D-2
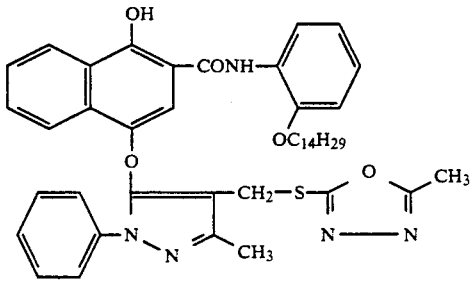

-continued
D-3
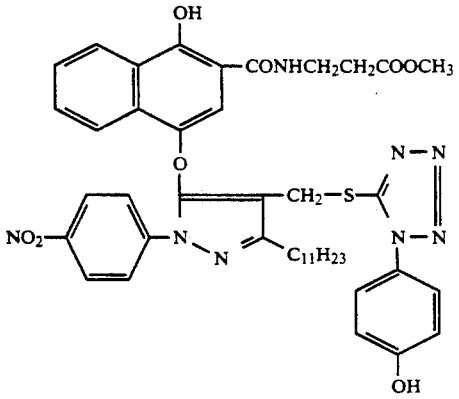
D-4
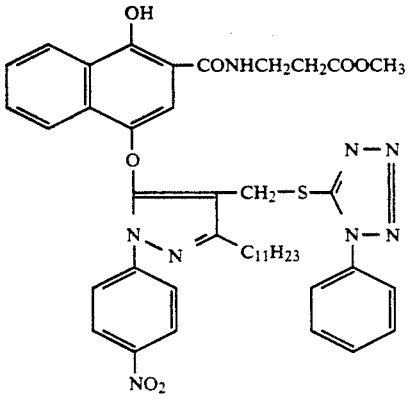
UV-1
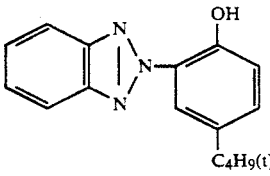
UV-2
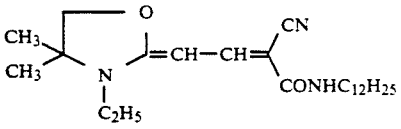
HS-1
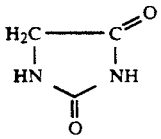
HS-2
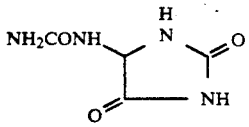
H-1
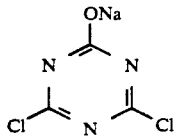
H-2
$(CH_2{=}CHSO_2CH_2)_2O$
Su-1
$NaO_3S{-}CH(COOCH_2(CF_2CF_2)_3H)CH_2COOCH_2(CF_2CF_2)_3H$ -continued
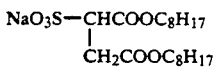
Su-2
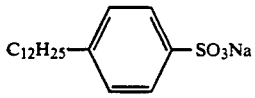
Su-3
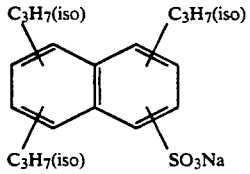
Su-4
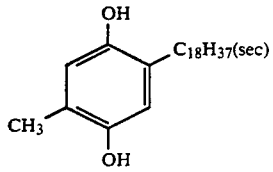
SC-1
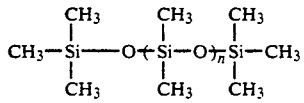
Weight average molecular weight Mw = 3,000
WAX-1
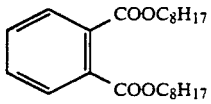
Oil-1
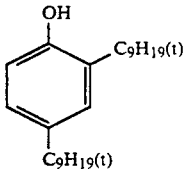
Oil-2
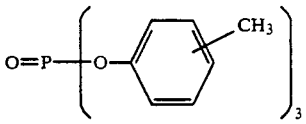
Oil-3
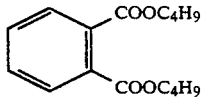
Oil-4
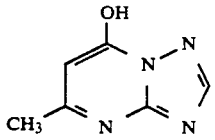
ST-1
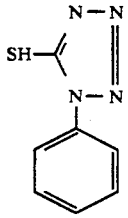
AF-1

-continued

AF-2

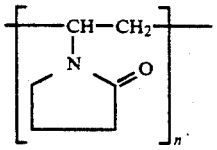

n: Degree of polymerization

Further, the samples 102 through 109 were prepared in the same manner as in the sample 101, except that the sensitizing dyes in the 3rd and 4th layers and those in the 6th and 7th layers were varied as shown in Table 1.

-continued

| [Color developer] | |
|---|---|
| Trisodium nitrilotriacetate (monohydrate) | 2.5 g |
| Potassium hydroxide | 1.0 g |

TABLE 1

| Sample No. (invention/ comparison) | 3rd layer Dye No. | 3rd layer Amount [mol/ Ag 1 mol] × $10^{-4}$ | 4th layer Dye No. | 4th layer Amount [mol/ Ag 1 mol] × $10^{-4}$ | 6th layer Dye No. | 6th layer Amount [mol/ Ag 1 mol] × $10^{-4}$ | 7th layer Dye No. | 7th layer Amount [mol/ Ag 1 mol] × $10^{-4}$ |
|---|---|---|---|---|---|---|---|---|
| 101 | (I-34) | 0.44 | (I-34) | 0.1 | (OD-1) | 3.0 | (OD-1) | 1.5 |
| (Comparison) | (I-6) | 2.2 | (I-6) | 1.2 | (OD-2) | 5.0 | (OD-2) | 2.5 |
| | (III-11) | 2.2 | (III-11) | 1.2 | | | | |
| 102 | (I-34) | 0.44 | (I-34) | 0.1 | (OD-1) | 1.0 | (OD-1) | 0.5 |
| (Comparison) | (I-6) | 2.2 | (I-6) | 1.2 | (OD-2) | 5.0 | (OD-2) | 2.5 |
| | (III-11) | 2.2 | (III-11) | 1.2 | (OD-20) | 2.0 | (OD-20) | 1.0 |
| 103 | (I-34) | 0.44 | (I-34) | 0.1 | (OD-1) | 1.0 | (OD-1) | 0.5 |
| (Comparison) | (I-6) | 4.4 | (I-6) | 2.4 | (OD-2) | 5.0 | (OD-2) | 2.5 |
| | | | | | (OD-20) | 2.0 | (OD-20) | 1.0 |
| 104 | (II-5) | 2.4 | (II-5) | 1.2 | (OD-1) | 1.0 | (OD-1) | 0.5 |
| (Comparison) | (III-11) | 2.45 | (III-11) | 1.3 | (OD-2) | 5.0 | (OD-2) | 2.5 |
| | | | | | (OD-20) | 2.0 | (OD-20) | 1.0 |
| 105 | (I-34) | 0.20 | (I-34) | 0.1 | (OD-1) | 3.0 | (OD-1) | 1.5 |
| (Comparison) | (I-6) | 0.65 | (I-6) | 0.4 | (OD-2) | 5.0 | (OD-2) | 2.5 |
| | (III-11) | 4.0 | (III-11) | 2.0 | | | | |
| 106 | (I-34) | 0.20 | (I-34) | 0.1 | (OD-1) | 1.0 | (OD-1) | 0.5 |
| (Invention) | (I-6) | 0.65 | (I-6) | 0.4 | (OD-2) | 5.0 | (OD-2) | 2.5 |
| | (III-11) | 4.0 | (III-11) | 2.0 | (OD-20) | 2.0 | (OD-20) | 1.0 |
| 107 | (I-6) | 1.0 | (I-6) | 0.5 | (OD-1) | 1.0 | (OD-1) | 0.5 |
| (Invention) | (II-5) | 3.85 | (II-5) | 2.0 | (OD-2) | 5.0 | (OD-2) | 2.5 |
| | | | | | (OD-20) | 2.0 | (OD-20) | 1.0 |
| 108 | (I-6) | 1.0 | (I-6) | 0.5 | (OD-1) | 1.0 | (OD-1) | 0.5 |
| (Invention) | (III-8) | 3.85 | (III-8) | 2.0 | (OD-2) | 5.0 | (OD-2) | 2.5 |
| | | | | | (OD-20) | 2.0 | (OD-20) | 1.0 |
| 109 | (I-6) | 1.0 | (I-6) | 0.5 | (OD-1) | 1.0 | (OD-1) | 0.5 |
| (Invention) | (II-5) | 1.9 | (II-5) | 1.0 | (OD-2) | 5.0 | (OD-2) | 2.5 |
| | (III-11) | 1.95 | (III-11) | 1.0 | (OD-20) | 2.0 | (OD-20) | 1.0 |

After photographing a color rendition chart made by Macbeth Co. with each of the samples 101 through 109, the sample was subjected to the following developing process.

| Processing (at 38° C.) | |
|---|---|
| Color developing | 3 min 15 sec |
| Bleaching | 6 min 30 sec |
| Washing | 3 min 15 sec |
| Fixing | 6 min 30 sec |
| Washing | 3 min 15 sec |
| Stabilizing | 1 min 30 sec |
| Drying | |

Compositions of processing solutions used in the respective processes are as follows:

| [Color developer] | |
|---|---|
| 4-amino-3-methyl-N-ethyl-N-(β-hydroxyethyl) aniline.sulfate | 4.75 g |
| Anhydrous.sodium sulfite | 4.25 g |
| Hydroxyamine ½ sulfate | 2.0 g |
| Anhydrous potassium carbonate | 37.5 g |
| Sodium bromide | 1.3 g |

Water was added to make 1 l and the pH was adjusted to 10.

| [Bleacher] | |
|---|---|
| Ammonium ferric ethylenediamine tetracetate | 100 g |
| Diammonium ethylenediamine tetracetate | 10.0 g |
| Ammonium bromide | 150.0 g |
| Glacial acetic acid | 10 ml |

Water was added to make 1 l, then the pH was adjusted to 6.0 with aqueous ammonia.

| [Fixer] | |
|---|---|
| Ammonium thiosulfate | 175.0 g |
| Anhydrous sodium sulfite | 8.5 g |
| Sodium metasulfite | 2.3 g |

Water was added to make 1 l, then the pH was adjusted to 6.0 with acetic acid.

| [Stabilizer] | |
|---|---|
| Formalin (37% aqueous solution) | 1.5 ml |
| Koniducks (made by Konica Corp.) | 7.5 ml |
| Water was added to make 1 ml. | |

From developed films, print was made on color papers (Konica Color PC Paper type SZ) so as to give the same density for the gray color of 0.7 optical density. Then, reproduced colors were subjected to colorimetry with a color analyzer model CMS-1200 made by Murakami Shikisai Co. The results are shown in FIG. 1 by the L* a* b* color system, wherein numbers 1 through 9 correspond to sample Nos. 101 through 109, respectively.

Further, wavelengths which give maximum spectral sensitivities to the green-sensitive and red-sensitive layers of each sample are shown in Table 2.

TABLE 2

| Sample No. (invention/ comparison) | Maximum sensitivity wavelength [nm] Green-sensitive layer | Red-sensitive layer | Sensitivity ratio of green-sensitive layer (%)* |
|---|---|---|---|
| 101 (Comparison) | 555 | 635 | 17 |
| 102 (Comparison) | 546 | 635 | 29 |
| 103 (Comparison) | 546 | 645 | 29 |
| 104 (Comparison) | 546 | 580 | 29 |
| 105 (Comparison) | 555 | 615 | 17 |
| 106 (Invention) | 546 | 615 | 29 |
| 107 (Invention) | 546 | 610 | 29 |
| 108 (Invention) | 546 | 615 | 27 |
| 109 (Invention) | 546 | 610 | 29 |

*The sensitivity ratio of a sensitivity of the green-sensitive layer at 500 nm to a sensitivity at a wavelength which gives a maximum sensitivity is also shown in Table 2. The term "sensitivity" used here means a sensitivity at a wavelength which gives a maximum sensitivity in a spectral sensitivity distribution at a density of minimum density + 0.7 in the green-sensitive layer, or a sensitivity at 500 nm in the green-sensitive layer.

In FIG. 1, color-reproduced points on a line connecting an original (° mark) and the origin have the same hue as the original.

In the present invention, reproduced points of purple (P), bluish purple (BF), bluish green (BG) and green (G) are near to the original in FIG. 1; that is, they can achieve a hue reproduction faithful to the original.

In FIG. 1, a reproduction point located far from the origin, on a line connecting an original and the origin, means that is has a high color purity (near to the original). It is apparent from FIG. 1 that each of the inventive samples does not cause lowering in purity of skin color.

What is claimed is:

1. A color photographic light-sensitive material comprising a support having thereon a blue-sensitive silver halide emulsion layer, a green-sensitive silver halide emulsion layer and a red-sensitive silver halide emulsion layer, wherein a maximum sensitivity wavelength $\lambda_R$ of a spectral sensitivity distribution of said red-sensitive silver halide emulsion layer is in a range of $$595\ \text{nm} \leqq \lambda_R \leqq 625\ \text{nm};$$

a maximum sensitivity wavelength $\lambda_G$ of a spectral sensitivity distribution of said green-sensitive silver halide emulsion layer is in a range of $$530\ \text{nm} \leqq \lambda_G \leqq 560\ \text{nm};$$

and a sensitivity of said green-sensitive silver halide emulsion layer at 500 nm is not less than one-fourth of the sensitivity at the maximum sensitivity wavelength $\lambda_G$.

2. A color photographic material of claim 1, wherein said red-sensitive silver halide emulsion layer contains at least one of the sensitizing dyes represented by Formula (I) and at least one of the sensitizing dyes represented by Formula (II) or (III), Formula (I)

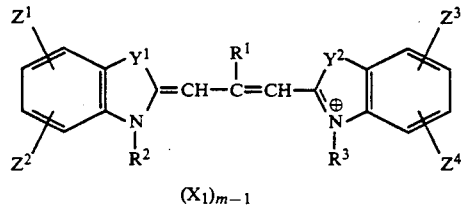

$(X_1)_{m-1}$ wherein $R^1$ represents a hydrogen atom, an alkyl group, or aryl group; $R^2$ and $R^3$ individually represent an alkyl group; $Y^1$ and $Y^2$ individually represent a sulfur atom or a selenium atom; $Z^1$, $Z^2$, $Z^3$ and $Z^4$ individually represent a hydrogen atom, a halogen atom, a hydroxyl group, an alkoxy group, an amino group, an acyl group, an acylamino group, an acyloxy group, an alkoxycarbonyl group, an aryl group, an aryloxy group, an aryloxycarbonyl group, a sulfonyl group, a carbamoyl group, an alkyl group or a cyano group, $Z^1$ and $Z^2$ and/or $Z^3$ and $Z^4$ may bond with each other to form a ring; $X_1$ represents a cation; and m represents an integer of 1 or 2, or represents 1 provided that the sensitizing dye (I) forms an intramolecular salt, Formula (II)

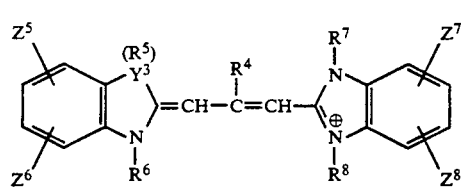

$(X_2)_{n-1}$ wherein $R^4$ represents a hydrogen atom, an alkyl group or an aryl group; $R^5$, $R^6$, $R^7$ and $R^8$ individually represent an alkyl group; $Y^3$ represents a nitrogen atom, a sulfur atom or a selenium atom, and no $R^5$ exist when $Y^3$ is a sulfur atom or a selenium atom; $Z^5$, $Z^6$, $Z^7$ and $Z^8$ individually represent a hydrogen atom, a halogen atom, a hydroxyl group, an alkoxy group, an amino group, an acyl group, an acylamino group, an acyloxy group, an aryloxy group, an alkoxycarbonyl group, an aryloxycarbonyl group, an alkoxycarbonylamino group, a carbamoyl group, an aryl group, an alkyl group, a cyano group, or a sulfonyl group, $Z^5$ and $Z^6$ and/or $Z^7$ and $Z^8$ may bond with each other to form a ring; $X_2$ represents a cation; and n represents an integer of 1 or 2, or represents 1 provided that the sensitizing dye (II) forms an intramolecular salt, Formula (III)

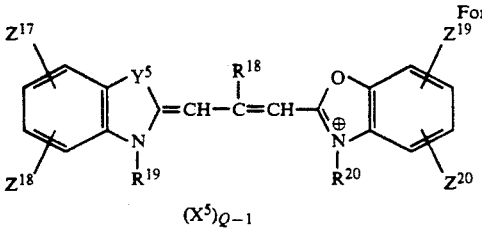

wherein $Y^5$ represents a sulfur or a selenium atom; $R^{18}$ represents a hydrogen atom, an alkyl group or an aryl group; $R^{19}$ and $R^{20}$ individually represent an alkyl group; $Z^{17}$, $Z^{18}$, $Z^{19}$ and $Z^{20}$ individually a hydrogen atom, a halogen atom, a hydroxy group, an alkoxy group, an amino or acylamino group, an alkoxycarbonyl or an alkoxycarbonylamino group, an aryl group, an alkyl group, $Z^{17}$ and $Z^{18}$ and/or $Z^{19}$ and $Z^{20}$ may bond with each other to form a ring; $X^5$ represents a cation; and Q represents an integer of 1 or 2, or represents 1 provided that the sensitizing dye (III) forms an intramolecular salt.

3. A color photographic material of claim 2, wherein said red-sensitive silver halide emulsion layer contains at least one of the sensitizing dyes represented by Formula (I) and at least one of the sensitizing dyes represented by Formula (II).

4. A color photographic material of claim 2, wherein $Y^1$ and $Y^2$ in Formula (I) is a sulfur atoms and $Y^3$ in Formula (II) represents N—$R_a$, wherein N represents an nitrogen atom and $R_a$ represents an alkyl group.

5. A color photographic material of claim 3, wherein $Y^1$ and $Y^2$ in Formula (I) is a sulfur atom and $Y^3$ in Formula (II) represents N—$R_a$, wherein N represents an nitrogen atom and $R_a$ represents an alkyl group.

* * * * *